July 23, 1929.  H. J. LESCHEN  1,721,600
GAUGE
Filed June 30, 1927
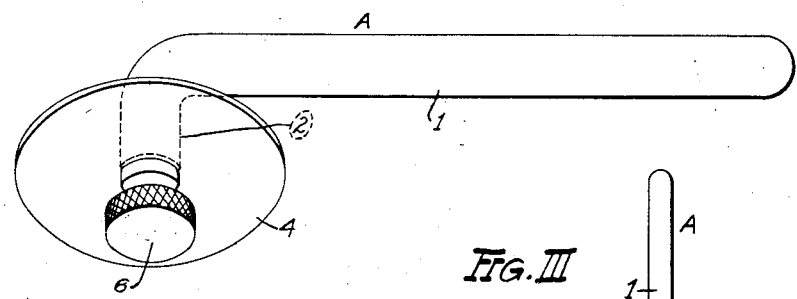
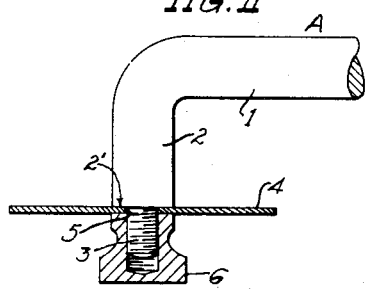
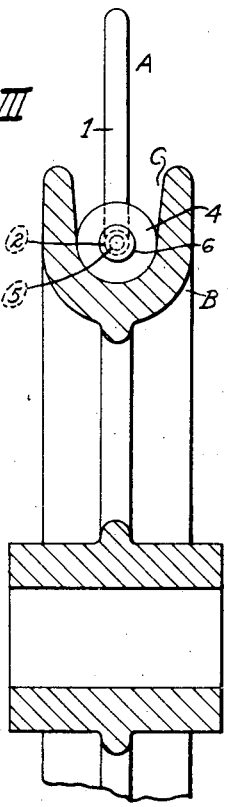
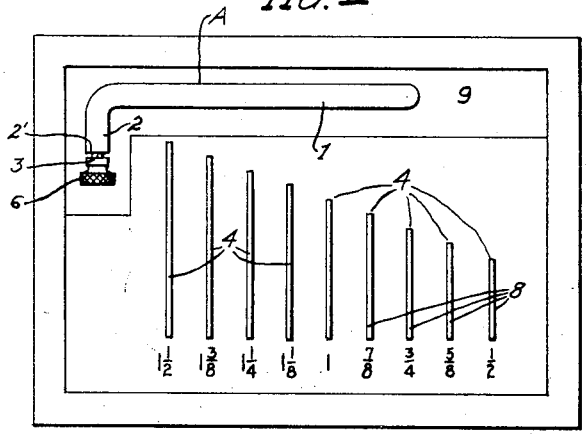
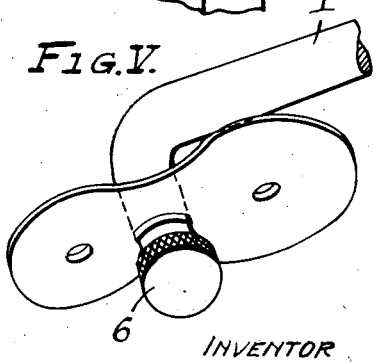
INVENTOR
H. J. LESCHEN
BY
ATTORNEY Patented July 23, 1929.

1,721,600

UNITED STATES PATENT OFFICE.

HARRY J. LESCHEN, OF WEBSTER GROVES, MISSOURI, ASSIGNOR TO A. LESCHEN & SONS ROPE COMPANY, OF ST. LOUIS, MISSOURI, A CORPORATION OF MISSOURI.

GAUGE.

Application filed June 30, 1927. Serial No. 202,525.

This invention relates generally to gauges and particularly to an improved gauge adapted for use in determining whether or not the groove in a sheave wheel over which a wire rope is to operate, is of the proper dimensions.

Wire ropes frequently operate over sheave wheels and when this is so, it is of extreme importance that the grooves in the sheave wheels through which the wire ropes pass be of exactly the proper dimensions so that the wire ropes will not be crushed or otherwise injured. Prior to this invention, it was customary to use a pear shaped piece of flat steel, one end of which was so shaped and was of such dimensions that it would fit into the groove, whereby the correctness of the shape and dimensions of the grooves of the sheave wheels might be determined. While this method of gauging the grooves of sheave wheels was reasonably efficient, it required that quite a number of these gauges be kept on hand, and because each piece of steel was a complete gauge in itself, quite a bit of material was present in a full set of gauges.

The objections set forth above are eliminated in the use of the gauge disclosed herein, which briefly stated comprises a handle element and a plurality of gauging elements of different sizes, any one of which may be attached to the handle element when it is desired to use same. In view of this arrangement, much of the material which is needlessly present in the gauges formerly used, is eliminated. Another advantage of the gauge disclosed herein, resides in the fact that the elements thereof, are confined within a suitable case whereby the liklihood that any parts of the device would be lost is greatly reduced.

Fig. I is a perspective of my improved gauge.

Fig. II is a fragmentary view showing the end portion of the handle at which the gauging element is attached, the gauging element and the nut by which the gauging element is secured in place, being shown in section.

Fig. III is a view showing the manner of using my improved gauge, said gauge being shown associated with a section of a fragment of a sheave wheel.

Fig. IV is a plan view of my improved gauge arranged in the case provided therefor, the lid of said case being removed.

Fig. V illustrates a modified form of the invention wherein an elongated gauging element is employed provided with gauging portions of different sizes at the opposite ends thereof.

In the drawing which shows one embodiment of my invention, A designates the handle of the gauge which comprises a straight portion 1 and a portion 2, arranged at an approximate right angle with respect to said straight portion. The portion 2 of the handle is provided at its outer end with a reduced portion 3, which is provided with external screw threads from end to end (Fig. II).

4 designates a plurality of gauging elements in the form of disks (Fig. IV) which vary in diameters from the smallest size shown in the drawing which is one-half of an inch to the largest size illustrated, which is one and one-half inch. It is obvious, of course, that these exact sizes need not be adhered to, the invention merely contemplating the use of a number of disks of different diameters as desired, and also any number of disks may be employed. Each of the disks 4 is provided at its approximate center with an aperture 5 of approximately the diameter of the threaded reduced portion 3 of the handle A.

In the use of my improved gauge the particular disk which it is desired to use, is attached to the handle A by passing the reduced threaded portion 3 of said handle through the aperture 5 in said disk, said disk being moved into contact with the shoulder 2' at the inner end of said portion 3. The disk 4 is secured in place on the handle by means of a nut 6, which as shown clearly in Fig. II is screwed on the threaded portion 3, and jams the disk against the shoulder 2' so that said disk is confined between said shoulder and the nut 6. In this manner the disk is very rigidly fixed to the handle and the complete device is used as shown in Fig. III, in which view B designates a sheave wheel having a circumferential groove C. It is plain that as the disk being used is of exactly the proper diameter, it may be readily determined whether or not the groove in the sheave wheel is properly proportioned.

In Fig. IV of the drawing, 7 designates the case for my improved gauge, said case being provided with a plurality of recesses 8 of the proper dimensions to receive the disks 4. The case 7 at convenient points is provided with numeral designations to indicate the sizes of the disks to be received by the various recesses 8. The case 7 is provided with a suitably shaped pocket 9 adapted to receive the handle A of the gauge and also said case will be provided with a suitable cover (not shown). I desire that it be understood that I do not wish to be limited to the use of the precise case illustrated, as cases of different forms may be employed.

While I have shown and described gauging elements in the form of disks, it is obvious that these elements may be of other shapes and also, I may give these elements an elongated shape and provide gauging portions at the opposite ends thereof, so that a pair of grooves of different sizes may be gauged with one element. Also, with this type of element, one or two apertures may be provided to receive the reduced threaded portion of the handle A.

It is obvious, of course, that while I have described my improved gauge as intended for use in gauging grooves of sheave wheels, it is not limited to this use, as it may be put to a variety of uses where it is desired to measure grooves of various shapes, it being merely necessary to provide gauging elements of the proper shapes and sizes to perform the gauging operation.

I claim:

1. A gauge comprising a handle having an offset portion provided with a screw-threaded portion, said screw-threaded portion being reduced in diameter to provide a shoulder adjacent to same, a gauging element mounted on said screw-threaded portion, and in contact with said shoulder, a nut screwed on said screw-threaded portion whereby said gauging element is confined between said shoulder and said nut to rigidly fix said gauging element to said handle portion.

2. A gauge comprising a handle having an offset portion provided with a screw-threaded portion, said screw-threaded portion being reduced in diameter to provide a shoulder adjacent to an end of same, a gauging element in the form of a disk, said disk being provided with an aperture at its approximate center through which said reduced screw-threaded portion of said handle is extended, and a nut screwed on said reduced screw-threaded portion in a manner to cause a portion of said disk to be confined between said shoulder and said nut whereby said disk is rigidly fixed to said handle.

In testimony that I claim the foregoing I hereunto affix my signature.

HARRY J. LESCHEN.